United States Patent Office 2,824,359
Patented Feb. 25, 1958

2,824,359

FABRICATED GAS TURBINE STRUCTURES

Edwin Clements Rhodes, Ealing, London, and David Wade Rhys, Hounslow, England, assignors to The International Nickel Company, Inc., New York, N. Y., a corporation of Delaware No Drawing. Application May 20, 1953
Serial No. 356,312

Claims priority, application Great Britain August 5, 1948

7 Claims. (Cl. 29—194)

The present invention relates to the art of joining metal parts, e. g., by soldering or brazing, which are subjected to high service temperatures, such as of the order of about 600° C. to about 850° C. and particularly to the joining of heat resistant chromium alloy members, such as members made of nickel-chromium or nickel-chromium-iron alloys, in the fabrication of structural gas turbine assemblies subjected in use to such elevated service temperatures.

It has heretofore been the practice to employ metal parts made of alloys consisting predominantly of nickel and chromium, which were to be used under conditions where considerable resistance to creep was required, such as, for example, in the making of blades for gas turbines. Under the conditions where resistance to creep was not so important, it has been customary to employ alloys wherein iron is the predominant element, such as the alloys commonly known as stainless steels which, as is well known, contain chromium. Such stainless steels were not adequate because as more powerful engines were designed, these steels did not have sufficient creep strength to withstand the high temperature conditions to which structural members of engines were subjected. While certain of the nickel-chromium alloys were found adequate as structural members in meeting some of the rigid requirements of gas turbines, special designs of structural members were generally resorted to in order to enable such parts to be sufficiently cooled during their use to prevent their overheating to temperatures at which resistance to creep was low. In attempts to overcome this difficulty, certain of the members were designed structurally as hollow parts, e. g., hollow turbine blades, and other structural shapes capable of being easily cooled. Such designs enabled the use of various types of chromium alloys, including nickel-chromium and nickel-chromium-iron alloys. However, in most instances, structural gas turbine subassemblies comprised of metal parts had to be produced by joining together a plurality of structural members by employing such joining means as soldering, brazing, etc.

The fabrication of structural gas turbine subassemblies by uniting together a plurality of chromium-containing alloy members presented joining problems due to the inherent tendency of the chromium-containing alloys to produce a tenacious film of chromium oxide on the surface near the area being joined which tended to interfere with the obtaining of a good sound joint, e. g., a lap joint, having the necessary high temperature properties to withstand the service conditions prevailing in gas turbines. The tenacious film of chromium oxide made joining of the alloy members difficult in that the solder material employed would not always satisfactorily wet and flow over the oxide film, even when the joining was carried out in a reducing atmosphere and with the assistance of an active flux. In instances when the joining or soldering alloy had adequate wetting or flowing properties, it did not have the required combination of other important properties to enable it to be used in a joint under the aforementioned specified conditions. While the joining alloy had to have satisfactory wetting and flowing characteristics, it also had to have requisite strength, creep resistance and scaling resistance at elevated service temperatures of the order of about 600° C. to 850° C. Moreover, the joining alloy had to have a sufficiently high solidus temperature so that fusion of the joining alloy would not occur during service and in addition the alloy had to have a low enough liquidus temperature to enable the joining operations to be carried out without detriment to the alloy members being joined. Also, it was desired that the liquidus and solidus temperatures be close together. For soldering nickel-chromium and nickel-chromium-iron alloys, it was required that the melting point of the solder should not be less than 900° C. nor more than 1250° C. It was also required that a joint, e. g., a lap joint, containing such an alloy have adequate resistance to shear. Although attempts had been made to meet the foregoing requirements, to overcome the foregoing difficulties and to solve the problem of providing high temperature structures having the requisite combination of properties and comprised of a plurality of members produced from alloys selected from heat resistant chromium-containing alloys, e. g., nickel-chromium and nickel-chromium-iron alloys, none, as far as we are aware, was entirely successful when carried into practice commercially on an industrial scale.

It has now been discovered that improved gas turbine structures can be obtained comprised of a plurality of high temperature chromium-containing alloy members united by one or more solder joints comprised of a special joining alloy having the necessary combination of properties required for producing good sound joints capable of satisfactory performance at elevated service temperatures, particularly in gas turbines.

An object of the invention is to provide a fabricated structural gas turbine assembly comprised of a plurality of heat resistant chromium-containing alloy members united by a solder joint comprised of a special joining alloy, the joined portions of the members having an improved combination of properties at elevated temperatures as compared to joined portions produced with conventional joining alloys.

Another object of the invention is to provide a fabricated gas turbine structure comprising members of a chromium-containing alloy, such as nickel-chromium and nickel-chromium-iron alloys, united by one or more solder joints comprised of a special joining alloy, said structure being characterized by high mechanical strength, high creep resistance and by improved resistance to oxidation and to scaling at elevated temperatures of the order of about 600° C. to 850° C.

It is a further object of the invention to provide a fabricated gas turbine blade comprised of members of a chromium-containing alloy, e. g., nickel-chromium and nickel-chromium-iron alloys, united by one or more solder joints containing a special soldering alloy, said turbine blade being characterized by high mechanical strength and by improved resistance to creep, to oxidation and to scaling at elevated temperatures of the order of about 600° C. to 850° C.

The invention also contemplates providing a fabricated hollow blade structure for gas turbines comprising members of a chromium-containing alloy, such as nickel-chromium and nickel-chromium-iron alloys, united by a joint comprised of a special joining alloy, said hollow blade structure being characterized by high mechanical strength and by improved resistance to creep, to oxidation and to scaling at elevated temperatures of the order of about 600° C. to 850° C.

Generally speaking, the present invention contemplates fabricated gas turbine structures and subassemblies, such as gas turbine blades, especially hollow blades comprising a plurality of parts or members united by one or more solder joints comprised of a special joining alloy containing palladium and aluminum as essential elements, the melting point of the joining alloy being at least 900° C. but not exceeding about 1250° C.

It has been discovered that by critically controlling the aluminum content of the palladium-aluminum alloy over a narrow range of composition, a joining alloy is obtained having the requisite melting range of temperatures enabling its use in uniting heat resistant nickel-chromium and nickel-chromium-iron alloys at controlled temperatures which do not substantially adversely affect the heat resistant alloy being joined. The joining alloy is characterized by improved wetting and flowing properties when in contact with chromium-containing metals having a high tendency to form tenacious, stable chromium oxide film at elevated joining temperatures, e. g., at soldering or brazing temperatures of the order of about 900° C. and above.

In carrying the invention into practice, satisfactory results have been obtained when the aluminum content lies between about 5% to 8%. As the aluminum content increases, the melting point increases rapidly so that the range of alloys which satisfies the stated conditions is critical. When the aluminum content falls below 5%, for example, down to 4% or 3% or lower, the liquidus temperature of the resulting alloy is so high, i. e., above 1300° C., that the metals being joined by the alloy tend to be detrimentally affected by the high joining temperature. Likewise, this is also true when the aluminum content of the palladium-aluminum joining alloy exceeds 8%, e. g., 9% or 10% or more of aluminum. Thus, it is important that the aluminum content of the alloy be controlled over the aforementioned critical range of 5% to 8% so that the results provided by the invention can be achieved.

It has been found that when the palladium-aluminum joining alloy provided by the invention is employed in brazing alloy members comprised of an alloy sold under the trademark Nimonic "80" (which contains approximately 20% chromium, 1.8% to 2.5% titanium, 0.9% to 1.5% aluminum and the balance nickel, including small amounts of incidental elements), it had good wetting and flowing properties and the joint produced had satisfactory resistance to scaling at service temperatures. In addition, the joint comprising the palladium-aluminum joining alloy had a high level of resistance to electrochemical corrosion and had adequate resistance to shear at room and elevated temperatures.

A binary alloy composition which had been found suitable in producing adequate joints between chromium-containing materials comprised about 93.5% palladium and 6.5% aluminum. This alloy, which is close to the eutectic composition, melts between about 1020° C. and 1140° C. Another binary alloy which has been found suitable in providing the results of the invention comprised about 93% palladium and about 7% aluminum. This alloy, which is also close to the eutectic composition, melts between about 1020° C. and 1080° C.

In evaluating the joining properties of a palladium-aluminum alloy containing about 7% aluminum, lap joints were produced from members of an alloy sold under the trademark Nimonic "80" by furnace brazing overlapped members with the joining alloy at a temperature of about 1100° C. in an atmosphere of hydrogen using various type fluxes. The joining alloy was employed in the form of a powder by employing a flux, such as borax, sodium fluoride, various borax-fluoride mixtures, etc. In all tests satisfactory wetting and flowing was obtained with the 7% aluminum alloy. Further tests have indicated that brazed lap joints comprising heat resistant chromium-containing alloy members can be obtained having satisfactory shear strength at a temperature of about 600° C. which enable the commercial fabrication of hollow gas turbine blades and other gas turbine structural sub-assemblies. It is preferred for consistent results that the aluminum content be controlled over the range of about 6.5% to 7.9%, e. g., about 7.1% to 7.6%.

In carrying the invention into practice, it has been found that the special palladium alloys containing about 5% to 8% aluminum can also contain silver in amounts up to about 15% without deleteriously affecting the properties of the alloy, provided that the melting range of the alloy containing silver lies within the range of 900° C. to 1250° C. One example of a silver-containing solder or joining alloy which can be used with advantage in joining nickel-chromium alloy members containing about 80% nickel and about 20% chromium, e. g., members made of an alloy sold under the trademark Nimonic "80," is a ternary alloy containing about 79.2% palladium, about 15.0% silver and about 5.8% aluminum. This alloy melts between the temperatures of about 950° C. and about 1050° C. and can be successfully and satisfactorily used for joints brazed in a furnace at a temperature of about 1100° C. using a hydrogen atmosphere and borax as a flux. Another suitable joining alloy is one containing 79.4% palladium, 14.7% silver and 5.9% aluminum. Both these alloys gave satisfactory results when employed in producing lap joints from strips of the aforementioned nickel-chromium alloy. The joints produced gave shear strength values at 600° C. of about 4 long tons per square inch up to as high as 6.9 long tons per square inch.

Of course, it will be appreciated that the joining alloys provided by the invention may contain small amounts of incidental elements without deleteriously affecting their properties. For instance, silver may be wholly or partially replaced by an equal amount of gold, or some of the palladium may be replaced by platinum provided that the platinum content does not exceed 10%. Furthermore, it is to be understood that when the special joining alloys are varied by incorporating silver or platinum in them, they must be of such composition that the melting point lies within the range of about 900° C. to about 1250° C. It is preferred that the alloys be substantially devoid of copper as copper detrimentally affects the resistance to scaling at elevated service temperatures.

It is to be observed that the present invention provides fabricated gas turbine sub-assemblies or structures made of parts of chromium-containing alloys, such as nickel-chromium and nickel-chromium-iron alloys, united by a joint comprised of a joining alloy containing palladium and aluminum as essential elements, whereby the united metal parts or members can be successfully and satisfactorily used at high service temperatures of the order of about 600° C. to about 850° C.

The present application is a continuation-in-part of our copending application Serial No. 108,427 filed August 3, 1949.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An improved fabricated hollow gas turbine blade made of a plurality of structural members of a heat resistant chromium-containing alloy selected from the group consisting of nickel-chromium and nickel-chromium-iron alloys united by at least one solder joint and adapted to be subjected to corrosive conditions prevailing in gas turbines at high service temperatures of the order of about 600° C. to 850° C. and characterized within said temperature range by high mechanical strength and high resistance to creep, to oxidation and to scaling, said solder joint comprising a palladium-base joining alloy containing about 6.5% to 7.9% aluminum and the balance essentially palladium, said joining alloy having a melting temperature of not less than about 900° C. nor more than about 1250° C.

2. An improved fabricated gas turbine structure made of a plurality of structural members of a heat resistant chromium-containing alloy selected from the group consisting of nickel-chromium and nickel-chromium-iron alloys united by at least one solder joint and adapted to be subjected to corrosive conditions prevailing in gas turbines at high service temperatures of the order of about 600° C. to 850° C. and characterized within said temperature range by high mechanical strength and high resistance to creep, to oxidation and to scaling, said solder joint comprising a palladium-base joining alloy containing about 5% to 8% aluminum, and the balance essentially palladium, said joining alloy having a melting temperature of not less than about 900° C. nor more than about 1250° C.

3. An improved fabricated gas turbine structure made of a plurality of structural members of a heat resistant chromium-containing alloy selected from the group consisting of nickel-chromium and nickel-chromium-iron alloys united by at least one solder joint and adapted to be subjected to corrosive conditions prevailing in gas turbines at high service temperatures of the order of about 600° C. to 850° C. and characterized within said temperature range by high mechanical strength and high resistance to creep, to oxidation and to scaling, said solder joint comprising a palladium-base joining alloy containing about 5% to 8% aluminum, silver up to about 15%, and the balance essentially palladium, said joining alloy having a melting temperature of not less than about 900° C. nor more than about 1250° C.

4. An improved fabricated gas turbine sub-assembly made of a plurality of structural members of a heat resistant chromium-containing alloy united by at least one solder joint and adapted to be subjected to corrosive conditions prevailing in gas turbines at high service temperatures of the order of about 600° C. to 850° C. and characterized within said temperature range by high mechanical strength and high resistance to creep, to oxidation and to scaling, said solder joint comprising a palladium-base joining alloy containing about 5% to 8% aluminum, up to about 15% of a metal from the group consisting of silver and gold, up to about 10% platinum, and the balance essentially palladium, said joining alloy having a melting temperature of not less than about 900° C. nor more than about 1250° C.

5. A solder characterized by an improved combination of properties, including good wetting and flowing properties in contact with chromium-containing metals, oxidation resistance, creep resistance and mechanical strength, and particularly adaptable for joining parts made of chromium-containing heat-resisting alloys into gas turbine structures and the like, which comprises 5% to 8% aluminum, up to about 15% of a metal from the group consisting of silver and gold, up to 10% platinum and the balance essentially palladium, said solder having a melting temperature of not less than about 900° C. nor more than about 1250° C.

6. A solder characterized by an improved combination of properties, including good wetting and flowing properties in contact with chromium-containing metals, oxidation resistance, creep resistance and mechanical strength, and particularly adaptable for joining parts made of chromium-containing heat-resisting alloys into gas turbine structures and the like, which comprises 5% to 8% aluminum, up to about 15% silver and the balance essentially palladium, said solder having a melting temperature of not less than about 900° C. nor more than about 1250° C.

7. A solder characterized by an improved combination of properties, including good wetting and flowing properties in contact with chromium-containing metals, oxidation resistance, creep resistance and mechanical strength, and particularly adaptable for joining parts made of chromium-containing heat-resisting alloys into gas turbine structures and the like, which comprises 6.5% to 7.9% aluminum and the balance essentially palladium, said solder having a melting temperature of not less than about 900° C. nor more than about 1250° C.

References Cited in the file of this patent

UNITED STATES PATENTS

| | | |
|---|---|---|
| 2,059,584 | Johnson | Nov. 3, 1936 |
| 2,303,403 | Spencer | Dec. 20, 1941 |
| 2,579,583 | Johnson | Dec. 25, 1951 |
| 2,654,946 | Rhodes | Oct. 13, 1953 |

FOREIGN PATENTS

| | | |
|---|---|---|
| 152,133 | Austria | Dec. 27, 1937 |
| 589,449 | Germany | Nov. 23, 1933 |
| 611,709 | Germany | Apr. 3, 1935 |